S. D. KING.
Lawn-Mowers.

No. 137,691.

Patented April 8, 1873.

Witnesses.
Geo. E. Upham.
J. B. Loomis.

Inventor.
Sidney D. King,
Chipman Hosmer & Co,
Attorneys.

UNITED STATES PATENT OFFICE.

SIDNEY D. KING, OF MIDDLETOWN, NEW YORK.

IMPROVEMENT IN LAWN-MOWERS.

Specification forming part of Letters Patent No. 137,691, dated April 8, 1873; application filed November 16, 1872.

*To all whom it may concern:*

Be it known that I, SIDNEY D. KING, of Middletown, in the county of Orange and State of New York, have invented a new and valuable Improvement in Lawn-Mowers; and I do hereby declare that the following is a full, clear, and exact description of the construction and operation of the same, reference being had to the annexed drawing making a part of this specification, and to the letters and figures of reference marked thereon.

Figure 1:
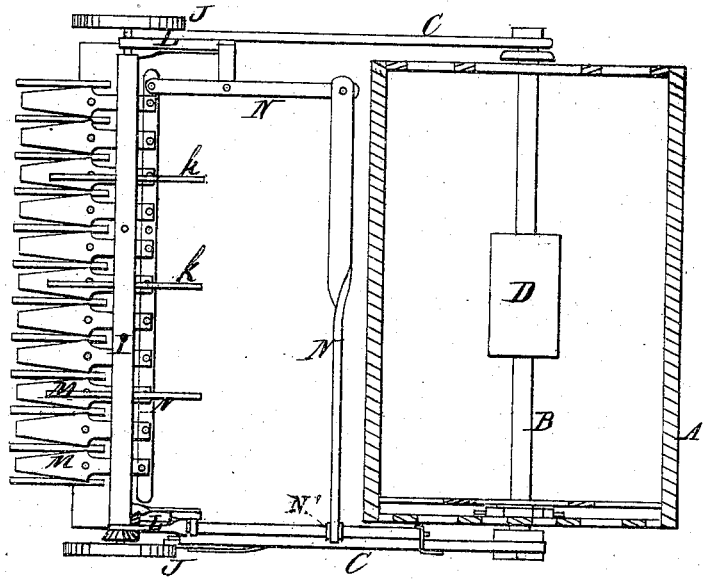
Figure 2:
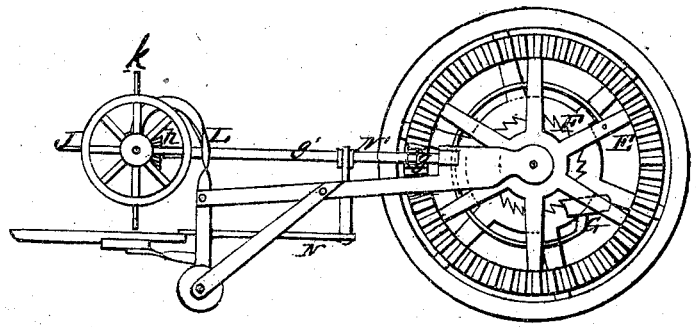

Figure 1 of the drawing is a representation of top view of my invention. Fig. 2 is a side view of the same.

My invention has relation to lawn-mowers; and it consists in providing the reel-shaft with balance-wheels for the purpose of keeping up its motion, after the machine is stopped, sufficiently long to rid itself of grass. This invention also consists in the construction and novel arrangement of devices for conveying motion from the roller to the reel and cutters, all substantially as hereinafter more fully described.

Referring to the accompanying drawing, A designates the roller, of a hollow cylindrical form; B, the roller-shaft, supported by the sides of the frame C, and holding the removable weight D. E is a beveled spur-wheel, placed loosely upon said shaft, and driven thereby, when the machine is propelled forward only, through the medium of the ratchet F and spring-pawl G. The wheel E drives a pinion, $g$, on a shaft, $g'$, which, by gearing $h$, conveys motion to the reel I, upon each end of the shaft of which is supported a balance-wheel, J. The reel is armed with fingers $k$, and is supported by bent standards L, which are designed to be hollow to hold waste for oil. The cutters M may be of any suitable form, and are actuated by means of the connecting-rods N, which are moved by an eccentric, N', on the shaft $g'$.

It will be observed that the relation between the reel and the ratchet and pawl is such that when the machine is brought to a stand still the reel may continue to revolve until the balance-wheels lose their momentum, the ratchet moving with them uncontrolled by the pawl.

What I claim as new, and desire to secure by Letters Patent, is—

1. The balance-wheels J, in combination with and attached to the reel of a lawn-mower, substantially as specified.

2. The combination of the roller A, spur-wheel E, ratchet F, pawl G, pinion $g$, shaft $g'$, reel I, and cutters M, substantially as specified, and for the purpose set forth.

In testimony that I claim the above I have hereunto subscribed my name in the presence of two witnesses.

SIDNEY D. KING.

Witnesses:
   CHAS. J. BOYD,
   SELAH R. CORWIN.